US012736911B2

(12) United States Patent
Okamura

(10) Patent No.: US 12,736,911 B2
(45) Date of Patent: Sep. 15, 2026

(54) IMAGE FORMING APPARATUS HAVING LOCKING DEVICE WITH FAILURE DETECTION

(71) Applicant: Hiroshi Okamura, Kanagawa (JP)

(72) Inventor: Hiroshi Okamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/045,025

(22) Filed: Feb. 4, 2025

(65) Prior Publication Data

US 2025/0291302 A1 Sep. 18, 2025

(30) Foreign Application Priority Data

Mar. 14, 2024 (JP) ................................ 2024-040302

(51) Int. Cl.

| | |
|---|---|
| ***G03G 21/00*** | (2006.01) |
| ***G03G 15/00*** | (2006.01) |
| ***G03G 15/08*** | (2006.01) |
| ***G03G 21/16*** | (2006.01) |

(52) U.S. Cl.

CPC ..... *G03G 21/1633* (2013.01); *G03G 15/0867* (2013.01); *G03G 15/5075* (2013.01); *G03G 15/556* (2013.01); *G03G 21/1647* (2013.01); *G03G 2221/1654* (2013.01)

(58) Field of Classification Search

USPC ........................................................... 399/8

See application file for complete search history.

(56) References Cited

U.S. PATENT DOCUMENTS

| | | | | |
|---|---|---|---|---|
| 2006/0110189 | A1 | 5/2006 | Matsuda et al. | |
| 2006/0133873 | A1 | 6/2006 | Andoh et al. | |
| 2006/0153604 | A1 | 7/2006 | Matsuda et al. | |
| 2006/0165442 | A1 | 7/2006 | Kobayashi et al. | |
| 2006/0182471 | A1 | 8/2006 | Okamura et al. | |
| 2010/0272452 | A1* | 10/2010 | Tsukijima .......... | G03G 21/1633 399/81 |
| 2011/0318050 | A1* | 12/2011 | Tomatsu ............ | G03G 21/1633 399/110 |
| 2014/0015192 | A1 | 1/2014 | Wakabayashi et al. | |

(Continued)

FOREIGN PATENT DOCUMENTS

| | | | |
|---|---|---|---|
| JP | 2020-190694 | A | 11/2020 |
| JP | 2024-006298 | A | 1/2024 |

*Primary Examiner* — Quana Grainger

(74) *Attorney, Agent, or Firm* — IPUSA, PLLC

(57) ABSTRACT

An image forming apparatus includes a replacement containing a consumable. A storage stores the replacement and has an opening through which the replacement is inserted into and removed from the storage. An open-close member opens and closes the opening. A locking device locks the open-close member in a state in which the open-close member closes the opening. A cover closes to cover the open-close member and prohibit the open-close member from opening. A cover detector detects whether or not the cover closes. A failure detector detects a failure of the locking device to determine whether or not the locking device switches to an unlocking state in which the locking device unlocks the open-close member in a case that the cover detector detects that the cover closes and that the failure detector determines that an amount of the consumable contained in the replacement is not greater than a predetermined threshold.

15 Claims, 10 Drawing Sheets

(56) References Cited

U.S. PATENT DOCUMENTS

| | | | |
|---|---|---|---|
| 2015/0108714 | A1 | 4/2015 | Wakabayashi et al. |
| 2017/0255152 | A1 | 9/2017 | Okamura et al. |
| 2018/0239285 | A1 | 8/2018 | Fujita et al. |
| 2018/0321074 | A1 | 11/2018 | Kushida et al. |
| 2018/0348664 | A1 | 12/2018 | Okamura et al. |
| 2020/0103792 | A1 | 4/2020 | Okamura |
| 2021/0243311 | A1* | 8/2021 | Obata ................ H04N 1/00037 |
| 2024/0004327 | A1 | 1/2024 | Yuji et al. |
| 2024/0377784 | A1 | 11/2024 | Yamahori et al. |

* cited by examiner

IMAGE FORMING APPARATUS HAVING LOCKING DEVICE WITH FAILURE DETECTION

CROSS-REFERENCE TO RELATED APPLICATION

This patent application is based on and claims priority pursuant to 35 U.S.C. § 119 (a) to Japanese Patent Application No. 2024-040302, filed on Mar. 14, 2024, in the Japan Patent Office, the entire disclosure of which is hereby incorporated by reference herein.

BACKGROUND

Technical Field

Embodiments of this disclosure relate to an image forming apparatus and an image forming method, and more particularly, to an image forming apparatus and an image forming method performed by the image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses accommodate a toner bottle that contains toner with which the image is formed.

SUMMARY

This specification describes below an improved image forming apparatus. In one embodiment, the image forming apparatus includes a replacement that contains a consumable and a storage that stores the replacement. The storage has an opening through which the replacement is inserted into and removed from the storage. An open-close member opens and closes the opening. A locking device locks the open-close member in a state in which the open-close member closes the opening. A cover opens and closes. The cover closes to cover the open-close member and prohibit the open-close member from opening. A cover detector detects whether or not the cover closes. A failure detector detects an unlocking failure of the locking device to determine whether or not the locking device switches to an unlocking state in which the locking device unlocks the open-close member in a case that the cover detector detects that the cover closes and that the failure detector determines that an amount of the consumable contained in the replacement is not greater than a predetermined threshold.

This specification further describes an improved image forming method. In one embodiment, the image forming method includes obtaining a detection result of a remaining amount of a consumable contained in a replacement, determining that the remaining amount of the consumable is not greater than a predetermined threshold, determining that an image forming apparatus is powered on, determining that a cover is closed, and detecting an unlocking failure of a locking device that does not unlock an open-close member that covers the replacement.

This specification further describes an improved image forming method. In one embodiment, the image forming method includes calculating a remaining amount of a consumable contained in a replacement, determining that the remaining amount of the consumable contained in the replacement is not greater than a predetermined threshold, detecting that a cover that is openable and closable is closed, the cover covering an open-close member in a state in which the open-close member that opens and closes an opening of a storage storing the replacement closes the opening in a case that the cover is closed, and detecting a failure to determine whether or not a locking device that locks the open-close member in a state in which the open-close member closes the opening switches to an unlocking state in which the locking device unlocks the open-close member.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
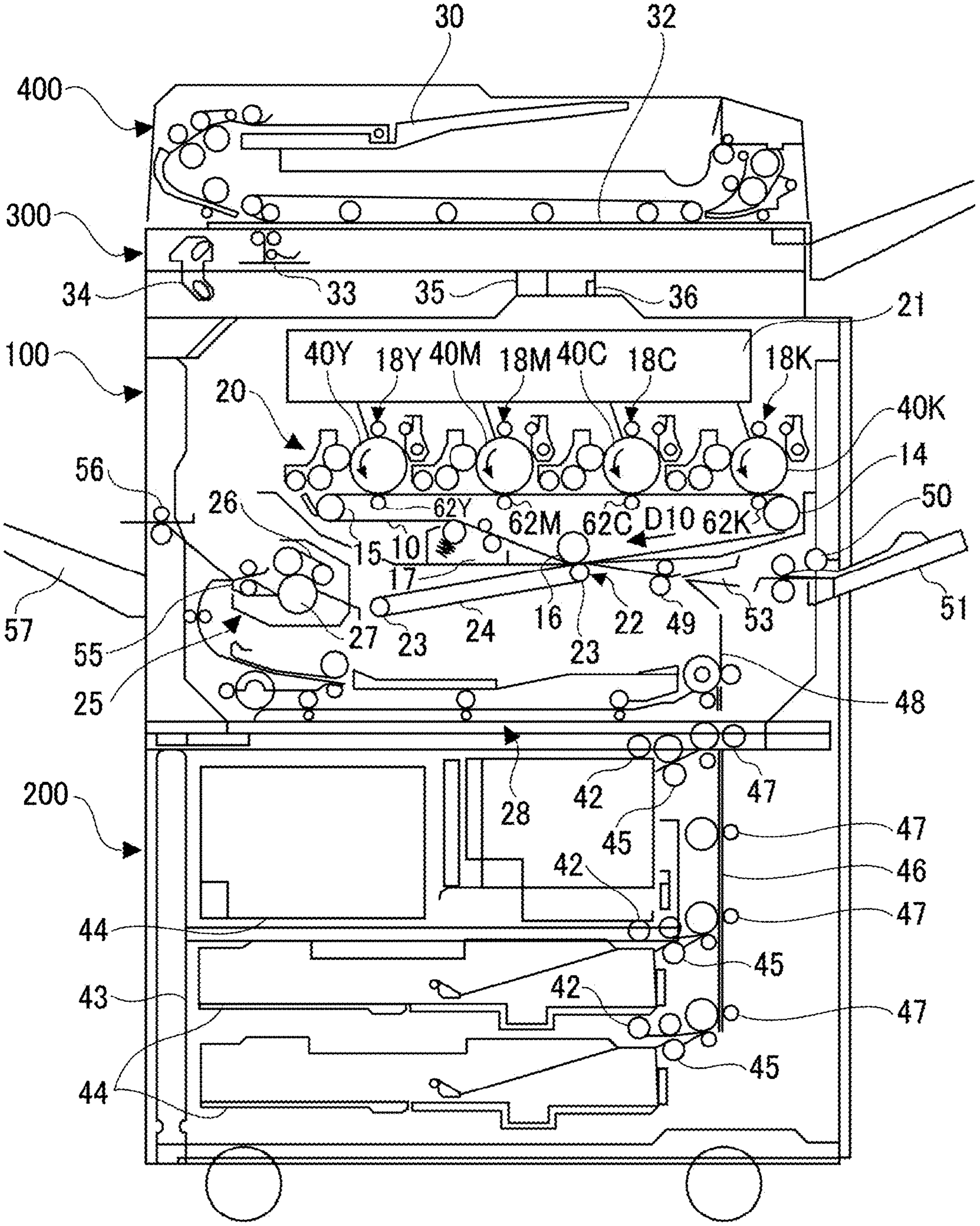
FIG. 1 is a cross-sectional view of an image forming apparatus according to a first embodiment of the present disclosure, illustrating a construction thereof as one example.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, a description is provided of the embodiments of the present disclosure. In order to facilitate understanding of the description, identical reference numerals are assigned to identical elements or components in the drawings and redundant descriptions are omitted.

The following describes the embodiments with tandem image forming apparatuses that employ an electrophotographic method and include a secondary transfer device, as one example.

Each of the image forming apparatuses according to the embodiments is a multifunction, full color digital copier, that is, a multifunction peripheral (MFP), that forms a color image by electrophotography, for example. FIG. 1 is a schematic cross-sectional view of an image forming apparatus 100 according to a first embodiment of the present disclosure, illustrating a construction thereof.

Each of the image forming apparatuses according to the embodiments is the MFP that is installed with components used for copying, printing, facsimile, and the like inside a single body of the MFP. In addition to plain paper generally used for copying and the like, each of the image forming apparatuses uses recording media including an overhead projector (OHP) transparency, thick paper such as a card and a postcard, and an envelope. The following describes the image forming apparatuses using a sheet serving as a recording medium as one example.

A description is provided of the construction of the image forming apparatus 100 according to the first embodiment.

FIG. 1 illustrates the construction of the image forming apparatus 100 according to the first embodiment as one example. FIG. 1 is a cross-sectional view of the image forming apparatus 100 according to the first embodiment, illustrating key components thereof. As illustrated in FIG. 1, the image forming apparatus 100 includes an intermediate transfer unit that is disposed at a center of the image forming apparatus 100. The intermediate transfer unit includes an intermediate transfer belt 10 serving as an endless belt. The intermediate transfer belt 10 is looped over three support rollers, that is, a first support roller 14, a second support roller 15, and a third support roller 16, that are driven and rotated clockwise in FIG. 1.

The image forming apparatus 100 further includes an intermediate transferor cleaning unit 17 that is disposed on the left of the third support roller 16 of the three support rollers, that is, the first support roller 14, the second support roller 15, and the third support roller 16, in FIG. 1. The intermediate transferor cleaning unit 17 removes residual toner remaining on the intermediate transfer belt 10 after a toner image formed on the intermediate transfer belt 10 is transferred onto a sheet.

The image forming apparatus 100 further includes image forming devices 20 that are disposed opposite a portion of the intermediate transfer belt 10, that is interposed between the first support roller 14 and the second support roller 15. The image forming devices 20 include a yellow (Y) image forming device, a magenta (M) image forming device, a cyan (C) image forming device, and a black (K) image forming device that are arranged in a moving direction D10 of the intermediate transfer belt 10.

The yellow image forming device, the magenta image forming device, the cyan image forming device, and the black image forming device have a similar construction except that the yellow image forming device, the magenta image forming device, the cyan image forming device, and the black image forming device use toners in different colors, respectively. Hence, suffixes Y, M, C, and K that indicate the colors of the toners, respectively, may be omitted properly in the description below and the drawings.

The image forming devices 20 include photoconductive drums 40Y, 40M, 40C, and 40K serving as image bearers that bear yellow, magenta, cyan, and black toner images, charging rollers 18Y, 18M, 18C, and 18K, developing units, and cleaning units, respectively. The image forming devices 20 are removably installed in the image forming apparatus 100.

The image forming apparatus 100 further includes a cover that protects an interior of the image forming apparatus 100. The cover is tilted toward a front on a paper surface in FIG. 1 and opened. A user who uses the image forming apparatus 100 or a service engineer who performs maintenance of the image forming apparatus 100 opens the cover and accesses the interior of the image forming apparatus 100. Thus, the user or the service engineer removes the image forming device 20 from a predetermined position inside the image forming apparatus 100 or attaches the image forming device 20 to the predetermined position.

For example, each of the image forming devices 20 is a process cartridge drum unit (PCDU) that is replaced according to a life of each of the photoconductive drums 40Y, 40M, 40C, and 40K.

The image forming apparatus 100 further includes an optical beam scanner 21 that is disposed above the image forming devices 20 in FIG. 1. The optical beam scanner 21 irradiates the photoconductive drums 40Y, 40M, 40C, and 40K with light beams (e.g., laser beams) for image formation, respectively, thus forming electrostatic latent images on the photoconductive drums 40Y, 40M, 40C, and 40K according to image data.

The developing units develop the electrostatic latent images formed on the photoconductive drums 40Y, 40M, 40C, and 40K into yellow, magenta, cyan, and black toner images, respectively. The image forming apparatus 100 further includes primary transfer rollers 62Y, 62M, 62C, and 62K that primarily transfer the yellow, magenta, cyan, and black toner images onto the intermediate transfer belt 10 such that the yellow, magenta, cyan, and black toner images are superimposed on the intermediate transfer belt 10. Thus, a color toner image is formed on the intermediate transfer belt 10. The color toner image is borne on the intermediate transfer belt 10 as one example of an image bearer and is travelled in the moving direction D10 of the intermediate transfer belt 10.

The image forming apparatus 100 further includes a secondary transfer unit 22 that is disposed below the intermediate transfer belt 10 in FIG. 1. The secondary transfer unit 22 includes two rollers 23 and a secondary transfer belt 24 serving as an endless belt that is looped over the rollers 23. The secondary transfer unit 22 lifts and presses the intermediate transfer belt 10 against the third support roller 16. The secondary transfer belt 24 bears the sheet onto which the color toner image formed on the intermediate transfer belt 10 is secondarily transferred.

The image forming apparatus 100 further includes a fixing unit 25 that is disposed beside the secondary transfer unit 22 in FIG. 1. The fixing unit 25 fixes the color toner image on the sheet that is conveyed from the secondary transfer unit 22 in a state in which the sheet bears the color toner image that is secondarily transferred thereon. The fixing unit 25 includes a fixing belt 26 serving as an endless belt, a heating roller, and a pressure roller 27. The fixing belt 26 and the pressure roller 27 fix the color toner image transferred on a surface of the sheet thereon under heat and pressure.

The image forming apparatus 100 further includes a sheet reverse unit 28 that is disposed below the secondary transfer unit 22 and the fixing unit 25 in FIG. 1. The sheet reverse unit 28 reverses and conveys the sheet so that a toner image is formed on a back side of the sheet immediately after the color toner image is formed on a front side of the sheet.

A description is provided of a series of image forming processes for forming a toner image on a sheet, that is performed by the image forming apparatus 100.

The image forming apparatus 100 further includes a control panel, an auto document feeder (ADF) 400, an exposure glass 32, and an image reading unit 300. The ADF 400 feeds an original automatically and includes an original tray 30. As the user presses a start key on the control panel to start copying, in a case that the original is placed on the original tray 30, the ADF 400 conveys the original onto the exposure glass 32. Conversely, in a case that the original is not placed on the original tray 30, the image reading unit 300 including a first carriage 33 and a second carriage 34 is driven to read an image on the original placed on the exposure glass 32 manually by the user.

The first carriage 33 of the image reading unit 300 includes a light source and a first mirror. The light source emits light onto the exposure glass 32. The first mirror of the first carriage 33 reflects the light reflected by a surface on the original toward the second carriage 34. The second carriage 34 includes a mirror that reflects the reflected light. The image reading unit 300 further includes an imaging lens 35 and a charge-coupled device (CCD) 36 serving as a reading sensor. The imaging lens 35 causes the reflected light to form an image on a capturing face of the CCD 36. The CCD 36 captures the image on the surface of the original into an image signal based on which yellow, magenta, cyan, and black image data are created.

When the user presses the start key to start printing, when the image forming apparatus 100 receives an instruction for image formation from an external device such as a personal computer (PC), or when the image forming apparatus 100 receives an instruction for output by facsimile (FAX), the image forming apparatus 100 starts driving and rotating the intermediate transfer belt 10 and causes the components and the units of the image forming devices 20 to be ready for image formation.

Thereafter, the image forming apparatus 100 starts image forming processes according to the yellow, magenta, cyan, and black image data. The optical beam scanner 21 emits laser beams modulated according to the yellow, magenta, cyan, and black image data onto the photoconductive drums 40Y, 40M, 40C, an 40K, respectively, forming electrostatic latent images. The developing units develop the electrostatic latent images into yellow, magenta, cyan, and black toner images, respectively, that are transferred and superimposed onto the intermediate transfer belt 10 as a color toner image.

Thereafter, at a time when a leading end of the color toner image formed on the intermediate transfer belt 10 enters the secondary transfer unit 22, a sheet is sent to the secondary transfer unit 22 at a proper time when a leading end of the sheet enters the secondary transfer unit 22. The secondary transfer unit 22 secondarily transfers the color toner image formed on the intermediate transfer belt 10 onto the sheet. The sheet, that is secondarily transferred with the color toner image, is sent to the fixing unit 25 that fixes the color toner image on the sheet.

A description is provided of feeding of the sheet to a secondary transfer position.

The image forming apparatus 100 further includes a feed table 200 that includes a plurality of feed rollers 42 and a sheet feeder unit 43. The sheet feeder unit 43 includes a plurality of feed trays 44 stacked in multiple tiers. As one of the feed rollers 42 is driven and rotated, the feed roller 42 picks up and feeds the sheet from one of the feed trays 44. The image forming apparatus 100 further includes a plurality of separation rollers 45 and a conveyance roller unit 46 that includes a plurality of conveyance rollers 47. The separation roller 45 separates the sheet from other sheets. As the sheet enters the conveyance roller unit 46, the conveyance roller 47 conveys the sheet. The image forming apparatus 100 further includes a conveyance roller unit 48 including a registration roller pair 49. As the sheet is guided to the conveyance roller unit 48, the sheet strikes the registration roller pair 49 that halts the sheet temporarily. Thereafter, as described above, the registration roller pair 49 feeds the sheet to the secondary transfer unit 22 at the time when the color toner image formed on the intermediate transfer belt 10 reaches the secondary transfer unit 22.

The image forming apparatus 100 further includes a bypass tray 51, a feed roller 50, and a bypass feeding path 53. Alternatively, the user may place sheets on the bypass tray 51 manually. In a case that the user places the sheets on the bypass tray 51, the feed roller 50 is driven and rotated to separate one of the sheets from other sheets on the bypass tray 51 and pull the sheet into the bypass feeding path 53. Similarly to the sheet sent from the feed tray 44 described above, as the sheet strikes the registration roller pair 49, the registration roller pair 49 halts the sheet temporarily. The registration roller pair 49 feeds the sheet to the secondary transfer unit 22 at the time when the color toner image formed on the intermediate transfer belt 10 reaches the secondary transfer unit 22 as described above.

The image forming apparatus 100 further includes a switch pawl 55, an output roller pair 56, and an output tray 57. After the fixing unit 25 fixes the color toner image on the sheet and ejects the sheet, the switch pawl 55 guides the sheet to the output roller pair 56. The output roller pair 56 ejects the sheet onto the output tray 57 where the sheets are stacked. Otherwise, the switch pawl 55 guides the sheet to the sheet reverse unit 28 that reverses and guides the sheet to the secondary transfer position again. Thereafter, a toner image is formed on the back side of the sheet. The output roller pair 56 ejects the sheet onto the output tray 57.

After the color toner image is transferred from the intermediate transfer belt 10 onto the sheet, the intermediate transferor cleaning unit 17 removes residual toner failed to be transferred onto the sheet and therefore remaining on the intermediate transfer belt 10 therefrom. Accordingly, the intermediate transfer belt 10 is ready for a next image forming job.

Thus, the image forming apparatus 100 forms the color toner image on the sheet.

Figure 2:
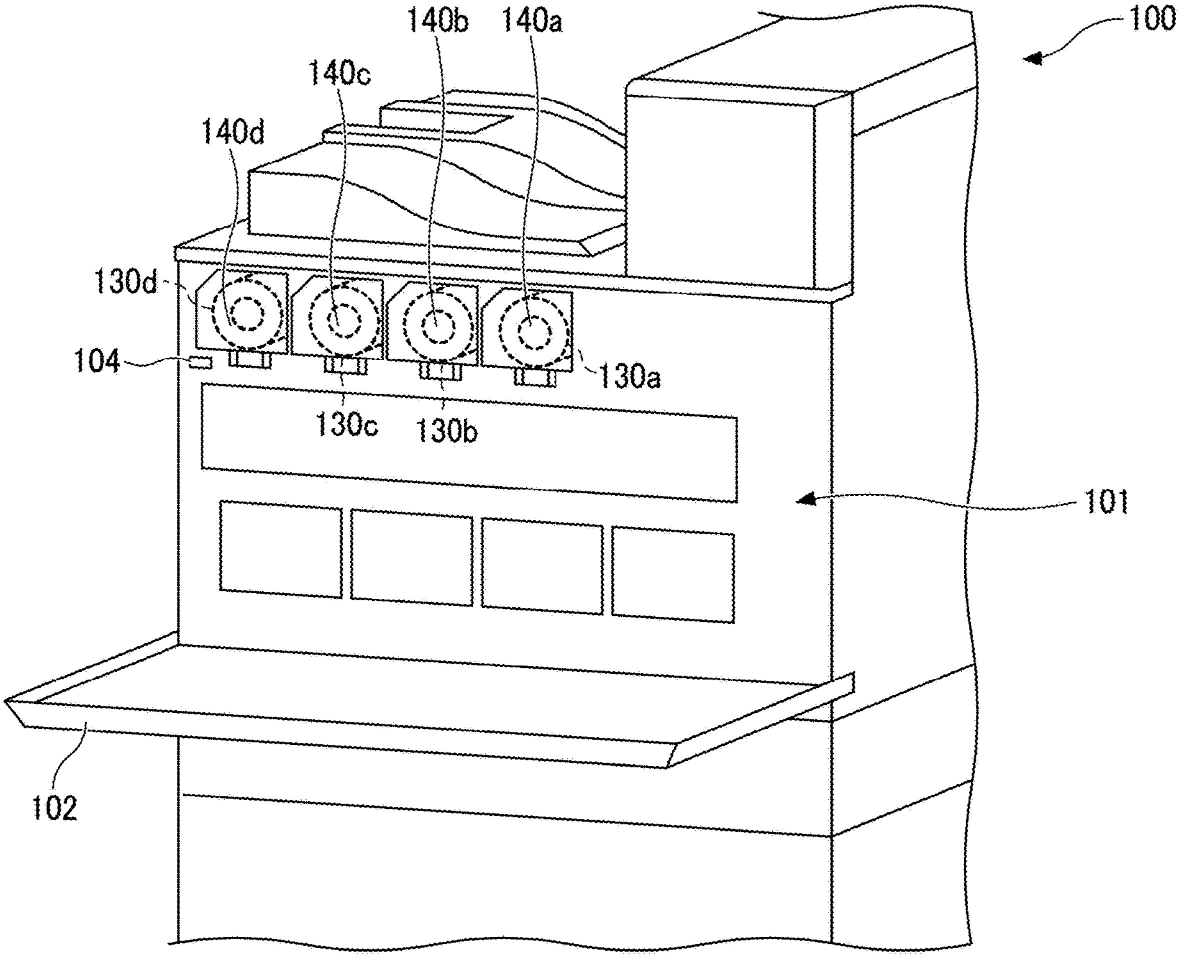
FIG. 2 is a perspective view of the image forming apparatus according to the first embodiment of the present disclosure depicted in FIG. 1, illustrating a front cover that opens.

As illustrated in FIG. 2, the image forming apparatus 100 further includes a front cover 102. FIG. 2 is a perspective view of the image forming apparatus 100 according to the embodiment, illustrating the front cover 102 that is open. As illustrated in FIG. 2, the image forming apparatus 100 according to the embodiment further includes a body 101, four toner bottles 130*a*, 130*b*, 130*c*, and 130*d*, and four bottle covers 140*a*, 140*b*, 140*c*, and 140*d*. The body 101 is attached with the front cover 102. In a state in which the front cover 102 is open, the bottle covers 140*a*, 140*b*, 140*c*, and 140*d* are disposed on a front face of the body 101. The bottle covers 140*a*, 140*b*, 140*c*, and 140*d* open and close to expose and cover openings through which the toner bottles 130*a*, 130*b*, 130*c*, and 130*d* are inserted into and removed from the body 101, respectively.

The front cover 102 is provided with a mechanism that opens and closes the front cover 102. For example, the front cover 102 is open when the toner bottles 130*a*, 130*b*, 130*c*, and 130*d* are inserted into and removed from the body 101.

In a state in which the front cover 102 is closed, the front cover 102 covers the bottle covers 140*a*, 140*b*, 140*c*, and 140*d*, preventing the bottle covers 140*a*, 140*b*, 140*c*, and 140*d* from opening.

The image forming apparatus 100 further includes a push sensor 104 that is disposed on the front face of the body 101. The push sensor 104 is one example of a detector that detects whether the front cover 102 is closed in a locked state or opened in an unlocked state. For example, while the front cover 102 is closed, the front cover 102 presses the push sensor 104. While the front cover 102 is open, the front cover 102 releases pressure applied to the push sensor 104. The push sensor 104 detects whether or not the front cover 102 closes based on pressure applied to the push sensor 104. According to the embodiment, the detector is not limited to the push sensor 104. The detector may be an open-close sensor or the like.

Figure 3:
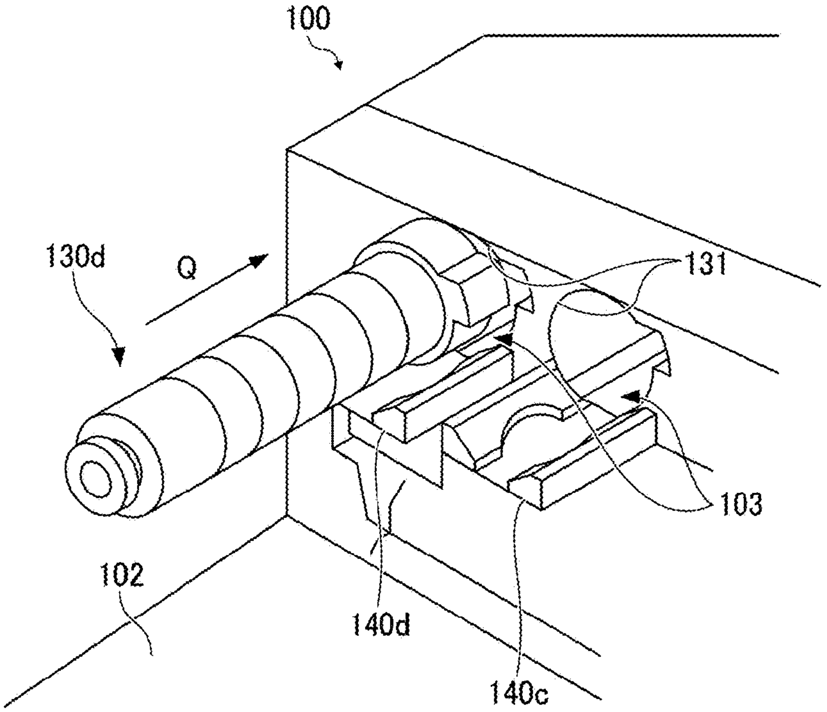
FIG. 3 is a perspective view of the image forming apparatus according to the first embodiment of the present disclosure depicted in FIG. 2, illustrating the front cover and a bottle cover that covers a toner bottle while the front cover and the bottle cover open.

FIG. 3 is a perspective view of the image forming apparatus 100 according to the embodiment, illustrating the front cover 102 and the bottle covers 140*d* and 140*c* that are open. As illustrated in FIG. 3, the bottle covers 140*d* and 140*c* that are open expose an interior of the body 101, that is, toner bottle storage compartments 103 serving as one example of storage mechanisms or storages that store the toner bottles 130*d* and 130*c* serving as replacements, respectively.

The image forming apparatus 100 further includes openings 131 through which the toner bottles 130*a*, 130*b*, 130*c*, and 130*d* are inserted into and removed from the toner bottle storage compartments 103, respectively, serving as one example of the storages. The bottle covers 140*a*, 140*b*, 140*c*, and 140*d* serving as open-close members expose and cover the openings 131, respectively.

As the toner bottle 130*a*, 130*b*, 130*c*, or 130*d* moves in a moving direction Q and is inserted and stored into the toner bottle storage compartment 103, a shutter of the toner bottle 130*a*, 130*b*, 130*c*, or 130*d* moves in accordance with motion of the toner bottle 130*a*, 130*b*, 130*c*, or 130*d*. The shutter opens a discharge port of toner of the toner bottle 130*a*, 130*b*, 130*c*, or 130*d*. The discharge port communicates with a refill port through which toner is supplied from the toner bottle 130*a*, 130*b*, 130*c*, or 130*d* to the developing unit disposed inside the body 101.

Each of the toner bottles 130*a*, 130*b*, 130*c*, and 130*d* is a tubular bottle, for example. Alternatively, each of the toner bottles 130*a*, 130*b*, 130*c*, and 130*d* may have an arbitrary shape.

As the user opens the front cover 102 of the image forming apparatus 100 and opens the bottle cover 140*a*, 140*b*, 140*c*, or 140*d* disposed opposite the toner bottle 130*a*, 130*b*, 130*c*, 130*d* to be replaced, the user removes the toner bottle 130*a*, 130*b*, 130*c*, or 130*d* from the toner bottle storage compartment 103 disposed inside the body 101 in a direction opposite to the moving direction Q or inserts the toner bottle 130*a*, 130*b*, 130*c*, or 130*d* into the toner bottle storage compartment 103 in the moving direction Q.

Figure 4:
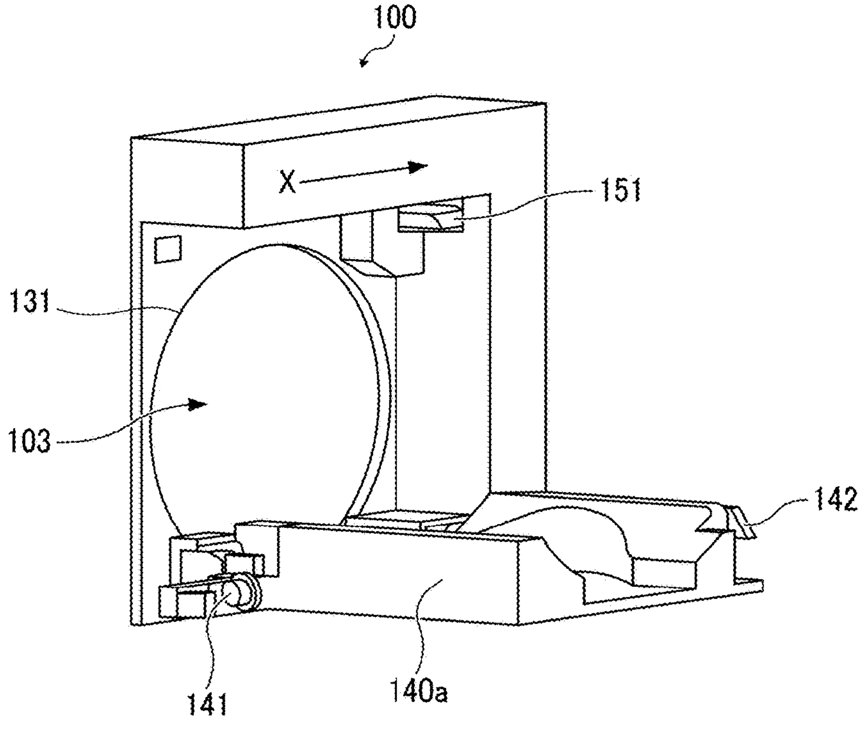
FIG. 4 is a perspective view of the image forming apparatus according to the first embodiment of the present disclosure depicted in FIG. 2, illustrating the bottle cover that opens.

FIG. 4 is a perspective view of the image forming apparatus 100 according to the embodiment, illustrating the bottle cover 140*a* that is open. The image forming apparatus 100 according to the embodiment further includes an open-close shaft 141 about which the bottle cover 140*a* pivots. The image forming apparatus 100 further includes a spring that biases the bottle cover 140*a* in a pivot direction in which the bottle cover 140*a* pivots and opens. The image forming apparatus 100 further includes a hook 142 and a latch 151. The bottle cover 140*a* mounts the hook 142. The latch 151 is disposed in proximity to the toner bottle storage compartment 103. The hook 142 and the latch 151 construct a part of a locking device 150 serving as a locking mechanism according to the embodiment illustrated in FIGS. 5A and 5B.

A description is provided of a construction of the locking device 150.

Figure 5A:
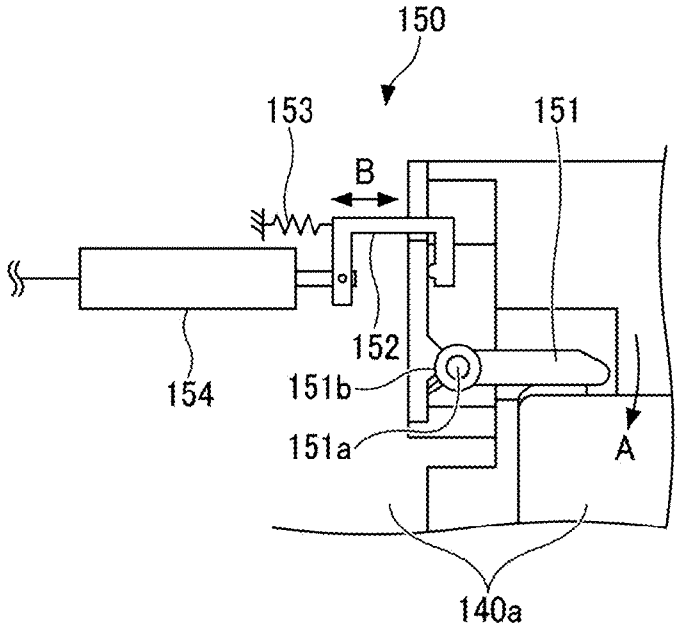
FIG. 5A is a cross-sectional view of a locking device that is incorporated in the image forming apparatus according to the first embodiment of the present disclosure depicted in FIG. 2 and locks the bottle cover, seen in X-direction in FIG. 4.
Figure 5B:
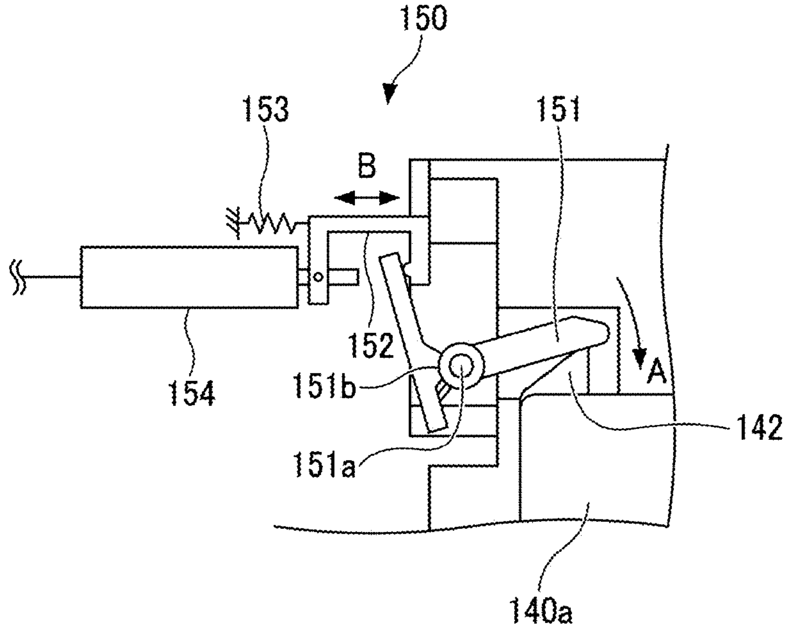
FIG. 5B is a cross-sectional view of the locking device that is incorporated in the image forming apparatus according to the first embodiment of the present disclosure depicted in FIG. 2 and locks the bottle cover, seen in X-direction in FIG. 4.

FIG. 5A is a cross-sectional view of the locking device 150 that locks the bottle cover 140*a* that is closed, seen in X-direction depicted in FIG. 4. FIG. 5B is a cross-sectional view of the locking device 150 that unlocks the bottle cover 140*a* that is open, seen in X-direction depicted in FIG. 4.

Referring to FIGS. 5A and 5B, a description is provided of a configuration of the bottle cover 140*a* that covers the toner bottle 130*a* containing black toner.

Each of the bottle covers 140*b*, 140*c*, and 140*d* has a configuration similar to the configuration of the bottle cover 140*a*. Hence, a description of the configuration of each of the bottle covers 140*b*, 140*c*, and 140*d* is omitted.

The locking device 150 is a mechanism that locks the bottle cover 140*a*, 140*b*, 140*c*, or 140*d* as one example of the open-close member that closes. For example, as the hook 142 mounted on the bottle cover 140*a* engages the latch 151 disposed inside the body 101 of the image forming apparatus 100, the locking device 150 locks the bottle cover 140*a*. As the hook 142 disengages the latch 151, the locking device 150 unlocks the bottle cover 140*a*. The locking device 150 includes a shaft 151*a* and a spring 151*b*. The shaft 151*a* supports the latch 151 such that the latch 151 pivots about the shaft 151*a*. The spring 151*b* biases the latch 151 in a direction A depicted in FIGS. 5A and 5B in which the latch 151 engages the hook 142.

The locking device 150 further includes a link 152. The latch 151 has one end (e.g., a tip) that engages the hook 142 and another end that is opposite to the one end and engages the link 152.

The link 152 moves in a direction B depicted in FIG. 5A. In a case that the link 152 moves to a position depicted in FIG. 5B, in accordance with motion of the link 152, the latch 151 pivots in a direction in which the latch 151 disengages the hook 142 against a biasing force generated by the spring 151*b*. Thus, the locking device 150 unlocks the bottle cover 140*a*.

Conversely, in a case that the link 152 moves to a position depicted in FIG. 5A, the latch 151 pivots in a direction in which the latch 151 engages the hook 142 by the biasing force generated by the spring 151*b*. Thus, the locking device 150 locks the bottle cover 140*a*.

The locking device 150 further includes a link spring 153 that is anchored to the link 152. The link spring 153 biases the link 152 in a direction in which the latch 151 disengages the hook 142 against the biasing force generated by the spring 151*b*, that is, in a direction in which the link 152 moves to the position depicted in FIG. 5A.

The locking device 150 further includes a solenoid 154 that is coupled with the link 152. The solenoid 154 moves the link 152 in a direction in which the link 152 moves to the position depicted in FIG. 5B against a biasing force generated by the link spring 153. The image forming apparatus 100 further includes a driving control unit 155 described below with reference to FIG. 6. The driving control unit 155 controls operation of the solenoid 154. The driving control unit 155 switches power supply to the solenoid 154.

In a case that the driving control unit 155 supplies power to the solenoid 154, the solenoid 154 is energized and turned on. Accordingly, the link 152 moves in the direction in which the link 152 moves to the position depicted in FIG. 5B against the biasing force generated by the link spring 153. Consequently, in accordance with motion of the link 152, the latch 151 pivots in the direction in which the latch 151 disengages the hook 142 against the biasing force generated by the spring 151*b*. Thus, the locking device 150 unlocks the bottle cover 140*a* in an unlocking state.

In a case that the driving control unit 155 interrupts power supply to the solenoid 154, the solenoid 154 is turned off. Accordingly, the link 152 moves in the direction in which the link 152 moves to the position depicted in FIG. 5A by the biasing force generated by the link spring 153. Consequently, the latch 151 pivots in the direction in which the latch 151 engages the hook 142 by the biasing force generated by the spring 151*b*. Thus, the locking device 150 locks the bottle cover 140*a* in a locking state.

As described above, the locking device 150 according to the embodiment switches between the locking state and the unlocking state according to motion of the solenoid 154 (e.g., power supply to the solenoid 154).

With the construction of the locking device 150 described above, as the user installs the toner bottles 130*a*, 130*b*, 130*c*, and 130*d* and closes the bottle covers 140*a*, 140*b*, 140*c*, and 140*d*, the locking devices 150 lock the bottle covers 140*a*, 140*b*, 140*c*, and 140*d*, respectively. Before the locking devices 150 unlock the bottle covers 140*a*, 140*b*, 140*c*, and 140*d*, respectively, the locking devices 150 prohibit the user from removing the toner bottles 130*a*, 130*b*, 130*c*, and 130*d*. The locking device 150 having the construction described above prevents the user from replacing the toner bottle 130*a*, 130*b*, 130*c*, or 130*d* that contains remaining toner with a new toner bottle, suppressing redundant waste toner.

A description is provided of a configuration of a controller 156 of the image forming apparatus 100 according to the embodiment.

Figure 6:
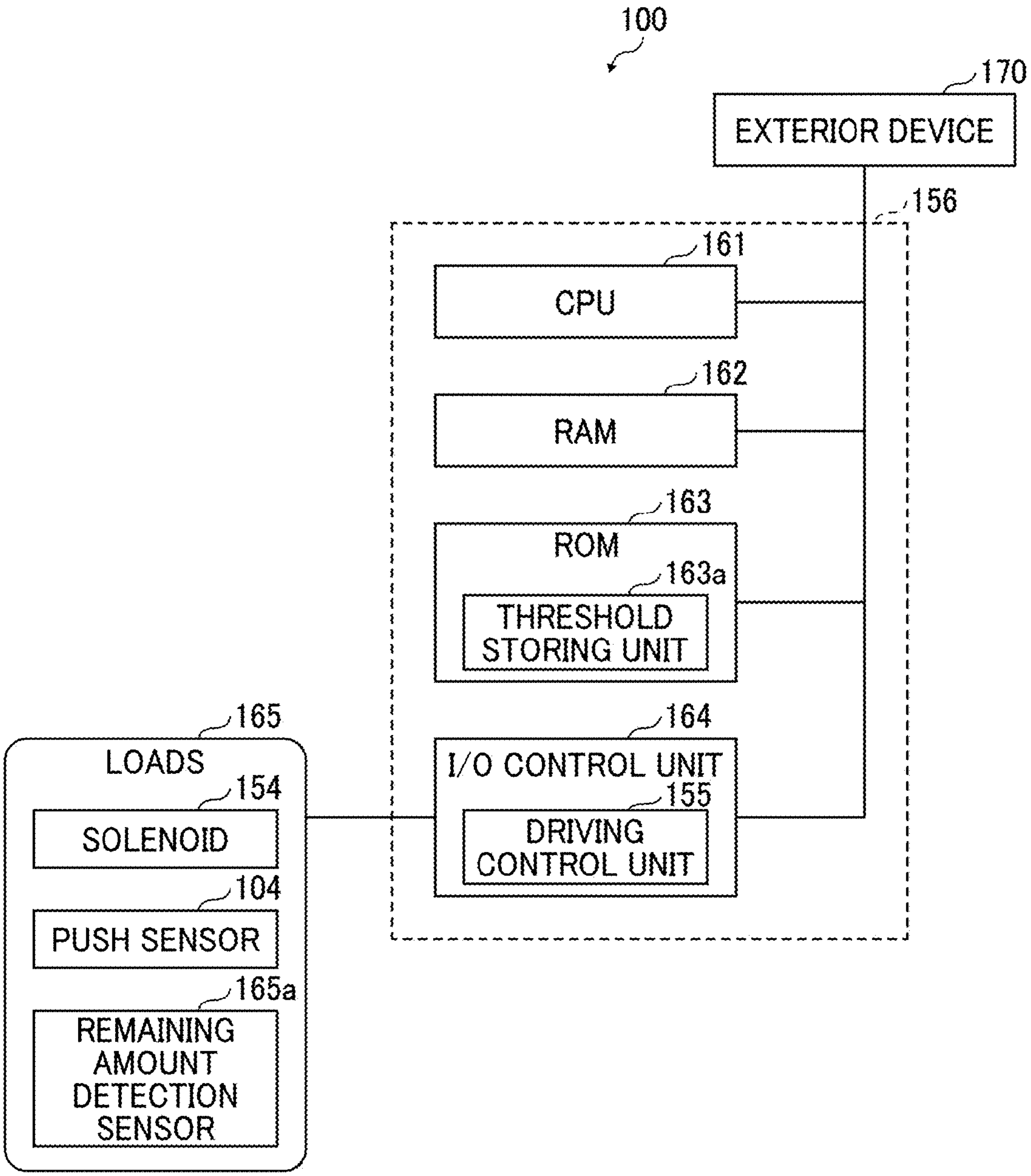
FIG. 6 is a block diagram of the image forming apparatus according to the first embodiment of the present disclosure depicted in FIG. 1, illustrating a configuration of a controller incorporated therein.

The controller 156 controls the components of the image forming apparatus 100. FIG. 6 is a block diagram of the controller 156 according to the embodiment, illustrating the configuration thereof. The controller 156 depicted in FIG. 6 is connected to the components incorporated in loads 165 disposed inside the image forming apparatus 100 through signal wire and the like. For example, the loads 165 disposed inside the image forming apparatus 100 include the solenoid 154, the push sensor 104, and a remaining amount detection sensor 165*a*.

The remaining amount detection sensor 165*a* detects a remaining amount of toner contained in the toner bottles 130*a*, 130*b*, 130*c*, and 130*d*. The remaining amount detection sensor 165*a* is not limited to a general sensor. The remaining amount detection sensor 165*a* may be any sensor that detects the remaining amount of toner.

The controller 156 is connected to an exterior device 170 to communicate with the exterior device 170. For example, the exterior device 170 includes a control panel and a display. For example, the controller 156 causes the display to display a screen based on data received from the loads 165.

The controller 156 includes a central processing unit (CPU) 161, a random access memory (RAM) 162, a read only memory (ROM) 163, and an input-output (I/O) control unit 164. The CPU 161, the RAM 162, the ROM 163, and the I/O control unit 164 are connected to each other through a bus.

For example, the CPU 161 controls the components of the image forming apparatus 100 according to programs stored in the ROM 163. The CPU 161 controls the components of the image forming apparatus 100 according to a control command input with the exterior device 170. For example, the control command input with the exterior device 170 includes instruction data input by the user with the control panel of the exterior device 170.

The RAM 162 is a memory that is readable and writable. The RAM 162 is used as a work area where the CPU 161 executes the programs.

The ROM 163 is a nonvolatile storage medium. The ROM 163 stores the programs executed by the CPU 161 and includes a threshold storing unit 163*a*.

The threshold storing unit 163*a* stores a threshold T relating to the remaining amount of toner. Detailed processes using the threshold T are described below. For example, the CPU 161 changes the threshold T stored in the threshold storing unit 163*a* according to the instruction data sent from the exterior device 170.

The I/O control unit 164 sends and receives data with respect to the loads 165. For example, the I/O control unit 164 includes an application-specific integrated circuit (ASIC). As the I/O control unit 164 writes data relating to the loads 165 into a registry, the CPU 161 refers to the data relating to the loads 165. Accordingly, the CPU 161 refers to detection results provided by the push sensor 104 and the remaining amount detection sensor 165*a*, respectively, for example.

The driving control unit 155 controls operation of the solenoid 154 and detects a failure of the solenoid 154.

In a case that the locking device 150 including the solenoid 154 according to the embodiment suffers from a failure, the locking device 150 prohibits the user from opening the bottle cover 140*a* that exposes and blocks the opening 131 (e.g., an opening or a port of the toner bottle storage compartment 103) through which the toner bottle 130*a* is inserted into and removed from the toner bottle storage compartment 103. Hence, the locking device 150 prohibits the user from replacing the toner bottle 130*a* with a new one until the service engineer finishes repairing or replacing the locking device 150.

Generally, at a time when the toner bottle 130*a* is empty and is to be replaced with a new one, the user causes the locking device 150 to unlock the bottle cover 140*a* so as to replace the toner bottle 130*a*. When the user fails to cause the locking device 150 to unlock the bottle cover 140*a*, the user recognizes a failure of the locking device 150 initially. The user may request the service engineer to start procuring replacement parts when the user recognizes the failure. Accordingly, the image forming apparatus 100 does not form a toner image until the service engineer finishes repairing the locking device 150. Hence, the image forming apparatus 100 may suffer from an extended downtime.

To address the circumstance, according to the embodiment, as a failure detector that detects a failure of the locking device 150, the driving control unit 155 that controls driving of the solenoid 154 includes a failure detection circuit that detects a failure of the solenoid 154. The driving control unit 155 sends a detection result of the failure to the CPU 161 through the registry.

The CPU 161 causes the display of the exterior device 170 to indicate the failure. Accordingly, for example, before the toner bottle 130*a* is empty and is to be replaced with a new one, the service engineer recognizes the failure of the locking device 150 (e.g., the failure of the solenoid 154). Hence, before the toner bottle 130*a* is to be replaced with a new one, that is, while toner remains in the toner bottle 130*a*, the service engineer starts preparation for repair or replacement of the locking device 150. Thus, according to the embodiment, even if the locking device 150 suffers from a failure, the image forming apparatus 100 decreases an extended time period for which the empty toner bottle 130*a* is not replaced.

Figure 7:
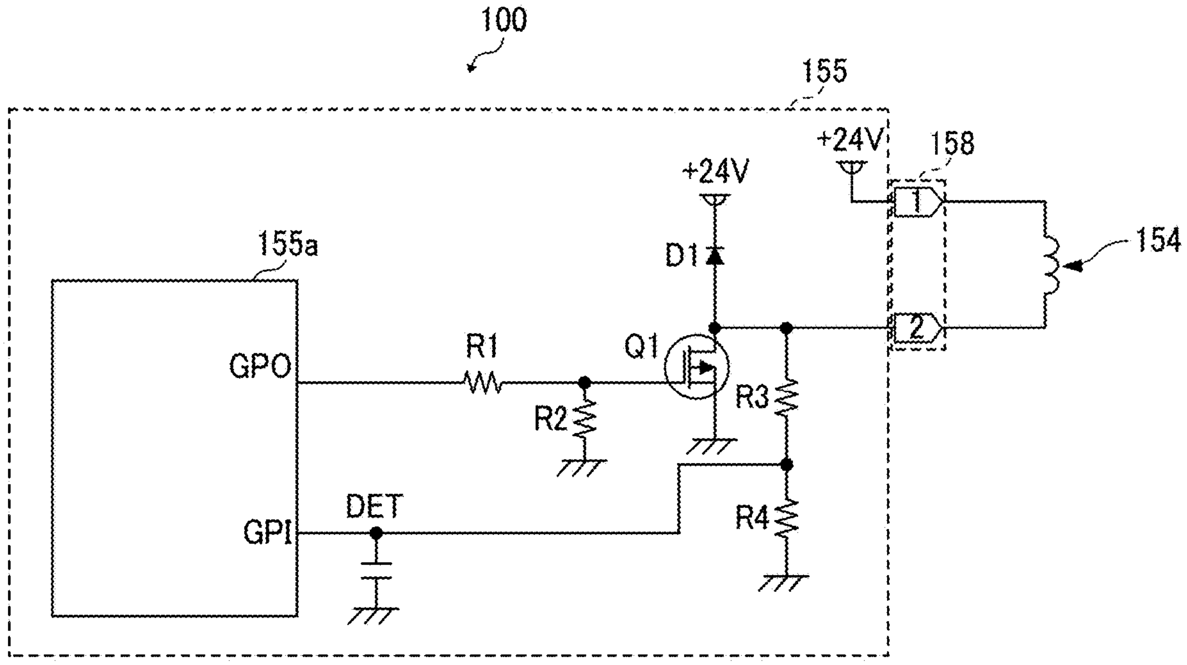
FIG. 7 is a diagram of a driving control unit including a failure detection circuit for a solenoid incorporated in the image forming apparatus according to the first embodiment of the present disclosure depicted in FIG. 6, illustrating a configuration of the driving control unit as one example.

FIG. 7 is a diagram of the driving control unit 155 including the failure detection circuit for the solenoid 154 according to the embodiment, illustrating a construction of the driving control unit 155 as one example. As illustrated in FIG. 7, the image forming apparatus 100 further includes a connector 158 through which the solenoid 154 is connected to the driving control unit 155.

The solenoid 154 includes a first terminal 1 that is connected to a power supply voltage of +24 V through the connector 158. The solenoid 154 further includes a second terminal 2 that is connected to a switching element Q1 constructed of a field effect transistor (FET), for example. The second terminal 2 is also connected to a power supply voltage of +24 V through a diode D1. The driving control unit 155 includes a controller 155*a* that is connected to the switching element Q1 through electrical resistance elements R1 and R2. The controller 155*a* includes a general-purpose outlet (GPO) and a general-purpose input (GPI).

In a case that the controller 155*a* turns on the switching element Q1, a voltage of the second terminal 2 of the solenoid 154 is stepped down to a ground voltage. Accordingly, the power supply voltage of +24 V connected to the first terminal 1 of the solenoid 154 flows an electric current through the solenoid 154. Thus, the solenoid 154 is supplied with power and is turned on.

Conversely, in a case that the controller 155*a* turns off the switching element Q1, a voltage of the second terminal 2 of the solenoid 154 is equivalent to a voltage of the first terminal 1 of the solenoid 154 by the power supply voltage of +24 V connected through the diode D1. Accordingly, an electric current does not flow through the solenoid 154. Thus, the solenoid 154 is not supplied with power and is turned off.

According to the embodiment, the second terminal 2 of the solenoid 154 is connected to two electrical resistance elements R3 and R4 connected in series. The electrical resistance elements R3 and R4 divide a voltage signal that is input to the GPI of the controller 155*a*. According to the embodiment, the voltage signal is used as a failure detection signal DET of the solenoid 154 of the locking device 150.

The driving control unit 155 according to the embodiment detects a deactivation failure of the solenoid 154, that is, a failure that the solenoid 154 is not turned off and an activation failure of the solenoid 154, that is, a failure that the solenoid 154 is not turned on.

The deactivation failure of the solenoid 154 (e.g., a locking failure) defines a failure that the locking device 150 does not switch to the locking state, in other words, a failure that the locking device 150 does not retain the locking state. Conversely, the activation failure of the solenoid 154 defines a failure that the locking device 150 does not switch to the unlocking state. For example, the failures are caused by open circuit in winding of the solenoid 154, disconnection of the solenoid 154 from the connector 158 (e.g., a harness), open circuit in the connector 158 (e.g., the harness), or the like.

A description is provided of a control method for detecting the deactivation failure of the solenoid 154 (e.g., the locking failure).

In order to turn off the solenoid 154, the controller 155*a* performs a control process to turn off the switching element Q1. In a case that the deactivation failure of the solenoid 154 does not occur, the solenoid 154 is turned off properly. In this case, a voltage of the second terminal 2 of the solenoid 154 is equivalent to the power supply voltage of +24 V. Hence, the failure detection signal DET input to the controller 155*a* is "high".

In a case that the deactivation failure of the solenoid 154 (e.g., the locking failure) occurs, the second terminal 2 of the solenoid 154 floats electrically. Accordingly, even if the controller 155*a* performs the control process to turn off the switching element Q1 so as to turn off the solenoid 154, the second terminal 2 of the solenoid 154 retains a voltage immediately before the switching element Q1 is turned off, that is, a ground voltage. Consequently, the failure detection signal DET input to the controller 155*a* is "low".

For example, the deactivation failure of the solenoid 154 (e.g., the locking failure) is also caused by a failure of the switching element Q1 of the driving control unit 155. For example, in a case that the switching element Q1 suffers from a failure, even if the controller 155*a* performs the control process to turn off the switching element Q1 so as to turn off the solenoid 154, the switching element Q1 remains being turned on. Accordingly, the second terminal 2 of the solenoid 154 retains the ground voltage. Consequently, the failure detection signal DET input to the controller 155*a* is "low".

As described above, the driving control unit 155 according to the embodiment detects the deactivation failure of the solenoid 154 (e.g., the locking failure) in a state in which the solenoid 154 is turned off (e.g., a state in which the solenoid 154 is not supplied with power). In other words, the driving control unit 155 detects the failure to determine whether or not the locking device 150 switches to the locking state.

A description is provided of a control method for detecting the activation failure of the solenoid 154 (e.g., an unlocking failure).

In order to turn on the solenoid 154, the controller 155*a* performs a control process to turn on the switching element Q1. In a case that the activation failure of the solenoid 154 (e.g., the unlocking failure) does not occur, the solenoid 154 is turned on properly. In this case, the voltage of the second terminal 2 of the solenoid 154 is stepped down to the ground voltage. Accordingly, the failure detection signal DET input to the controller 155*a* is "low".

In a case that the activation failure of the solenoid 154 (e.g., the unlocking failure) occurs, the second terminal 2 of the solenoid 154 floats electrically. Accordingly, even if the controller 155*a* performs the control process to turn on the switching element Q1 so as to turn on the solenoid 154, the second terminal 2 of the solenoid 154 retains a voltage immediately before the switching element Q1 is turned on, that is, the power supply voltage of +24 V. Consequently, the failure detection signal DET input to the controller 155*a* is "high".

For example, the activation failure of the solenoid 154 (e.g., the unlocking failure) is also caused by a failure of the switching element Q1 of the driving control unit 155. For example, in a case that the switching element Q1 suffers from a failure, even if the controller 155*a* performs the control process to turn on the switching element Q1 so as to turn on the solenoid 154, the switching element Q1 remains being turned off. In this case, the second terminal 2 of the solenoid 154 retains the power supply voltage of +24 V. Hence, the failure detection signal DET input to the controller 155*a* is "high".

As described above, the driving control unit 155 according to the embodiment detects the activation failure of the solenoid 154 (e.g., the unlocking failure) in a state in which the solenoid 154 is turned on (e.g., a state in which the solenoid 154 is supplied with power). In other words, the driving control unit 155 detects the failure to determine whether or not the locking device 150 switches to the unlocking state.

According to the embodiment, in a case that the driving control unit 155 detects the activation failure of the solenoid 154 (e.g., the unlocking failure), the controller 155*a* performs a control process to turn on the solenoid 154. In a case that the solenoid 154 operates properly, the solenoid 154 is turned on. Hence, as the locking device 150 unlocks the bottle cover 140*a*, the bottle cover 140*a* pivots in an open direction in which the bottle cover 140*a* opens by a biasing force generated by the spring.

As described above, in a state in which the front cover 102 closes, the front cover 102 presses the bottle cover 140*a* in a close direction in which the bottle cover 140*a* closes. Hence, the bottle cover 140*a* does not open.

Conversely, in a state in which the front cover 102 is open, in a case that the driving control unit 155 detects the activation failure of the solenoid 154 (e.g., the unlocking failure), if the solenoid 154 operates properly, the bottle cover 140*a* may open. In this case, whenever the user identifies the failure, the user closes the bottle cover 140*a*.

Conversely, in a case that the driving control unit 155 detects the deactivation failure of the solenoid 154 (e.g., the locking failure), the solenoid 154 is turned off. Hence, even if the front cover 102 is open, the bottle cover 140*a* does not open.

The controller 156 according to the embodiment instructs the driving control unit 155 to detect the deactivation failure of the solenoid 154 and the activation failure of the solenoid 154 at different times, respectively.

For example, the CPU 161 of the controller 156 determines whether or not it is a time to detect a failure. In a case that the CPU 161 of the controller 156 determines that it is the time to detect the failure, the CPU 161 instructs the driving control unit 155 to detect the failure.

Table 1 below illustrates a relation between a state of the front cover 102 and detection of the failure in the image forming apparatus 100 according to the embodiment.

TABLE 1

| State of front cover | Detecting activation failure of solenoid | Detecting deactivation failure of solenoid |
|---|---|---|
| Open | Do not perform | Perform |
| Close | Perform | Perform |

As illustrated in Table 1, in a case that the push sensor 104 detects that the front cover 102 is open, the controller 156 does not instruct the driving control unit 155 to detect the activation failure of the solenoid 154 (e.g., the unlocking failure), that is, "Detecting activation failure of solenoid" in Table 1.

When the controller 156 determines that it is the time to detect the failure, in a case that the push sensor 104 detects that the front cover 102 closes, the controller 156 instructs the driving control unit 155 to detect the activation failure of the solenoid 154 (e.g., the unlocking failure), that is, "Detecting activation failure of solenoid" in Table 1.

Conversely, in a case that the controller 156 determines that it is the time to detect the failure, regardless of whether or not the push sensor 104 detects that the front cover 102 is open, the controller 156 instructs the driving control unit 155 to detect the deactivation failure of the solenoid 154 (e.g., the locking failure), that is, "Detecting deactivation failure of solenoid" in Table 1.

In a case that the driving control unit 155 detects the failure, the controller 155*a* of the driving control unit 155 writes the input failure detection signal DET into the registry. Accordingly, the CPU 161 recognizes a detection result of the failure.

According to the embodiment, under a condition other than opening and closing of the front cover 102, the driving control unit 155 detects the activation failure of the solenoid 154 (e.g., the unlocking failure) and the deactivation failure of the solenoid 154 (e.g., the locking failure) at the different times, respectively.

The driving control unit 155 detects the failures at the different times, respectively, due to power consumption in a case that the driving control unit 155 detects the activation failure of the solenoid 154 (e.g., the unlocking failure).

In a case that the driving control unit 155 detects the activation failure of the solenoid 154 (e.g., the unlocking failure), power is supplied to the solenoid 154. That is, in a case that the driving control unit 155 detects the activation failure of the solenoid 154 (e.g., the unlocking failure) frequently, the solenoid 154 consumes power in an increased amount.

The failure of the locking device 150 does not affect image formation by the image forming apparatus 100. Hence, the service engineer repairs the locking device 150 before replacement of the toner bottle 130*a*, 130*b*, 130*c*, or 130*d*.

For example, in a case that the toner bottle 130*a*, 130*b*, 130*c*, or 130*d* contains toner in an increased remaining amount, there is time until the toner bottle 130a, 130b, 130c, or 130d is replaced. Hence, even if the driving control unit 155 detects the failure of the locking device 150, the service engineer does not repair the locking device 150 or does not replace parts urgently. In other words, the driving control unit 155 is requested to detect the failure of the locking device 150 before replacement of the toner bottle 130a, 130b, 130c, or 130d.

To address the circumstance, in a case that the toner bottle 130a, 130b, 130c, or 130d contains toner in a remaining amount not greater than a threshold T, the controller 156 according to the embodiment detects the activation failure of the solenoid 154 (e.g., the unlocking failure). Conversely, the controller 156 detects the deactivation failure of the solenoid 154 (e.g., the locking failure) without power consumption. Hence, the controller 156 detects the deactivation failure of the solenoid 154 regardless of the remaining amount of toner contained in the toner bottle 130a, 130b, 130c, or 130d.

For example, the CPU 161 of the controller 156 according to the embodiment refers to the threshold T stored in the threshold storing unit 163a. In a case that the push sensor 104 detects that the front cover 102 as one example of a cover closes and that the CPU 161 determines that the remaining amount of toner contained in the toner bottle 130a, 130b, 130c, or 130d is not greater than the threshold T, the CPU 161 of the controller 156 instructs the driving control unit 155 to detect the activation failure of the solenoid 154 (e.g., the unlocking failure). Thus, the driving control unit 155 detects the activation failure of the solenoid 154 (e.g., the unlocking failure). In other words, the driving control unit 155 detects the failure to determine whether or not the locking device 150 switches to the unlocking state in which the locking device 150 unlocks the bottle cover 140a, 140b, 140c, or 140d.

The threshold T stored in the threshold storing unit 163a according to the embodiment is determined according to an implementation. For example, the threshold T defines 50% of a default amount of toner contained in the toner bottle 130a, 130b, 130c, or 130d.

According to the embodiment, the threshold T may change according to usage of the image forming apparatus 100. Decrease in the remaining amount of toner contained in the toner bottle 130a, 130b, 130c, or 130d varies depending on usage of the image forming apparatus 100 by the user. For example, the remaining amount of toner contained in the toner bottle 130a, 130b, 130c, or 130d decreases sharply in a busy season. Accordingly, the controller 156 may preferably detect the failure of the locking device 150 early so that the service engineer repairs the locking device 150 while the user does not use the image forming apparatus 100.

To address the circumstance, according to the embodiment, the CPU 161 changes the threshold T stored in the threshold storing unit 163a according to instruction data received from the control panel of the exterior device 170.

Figure 8:
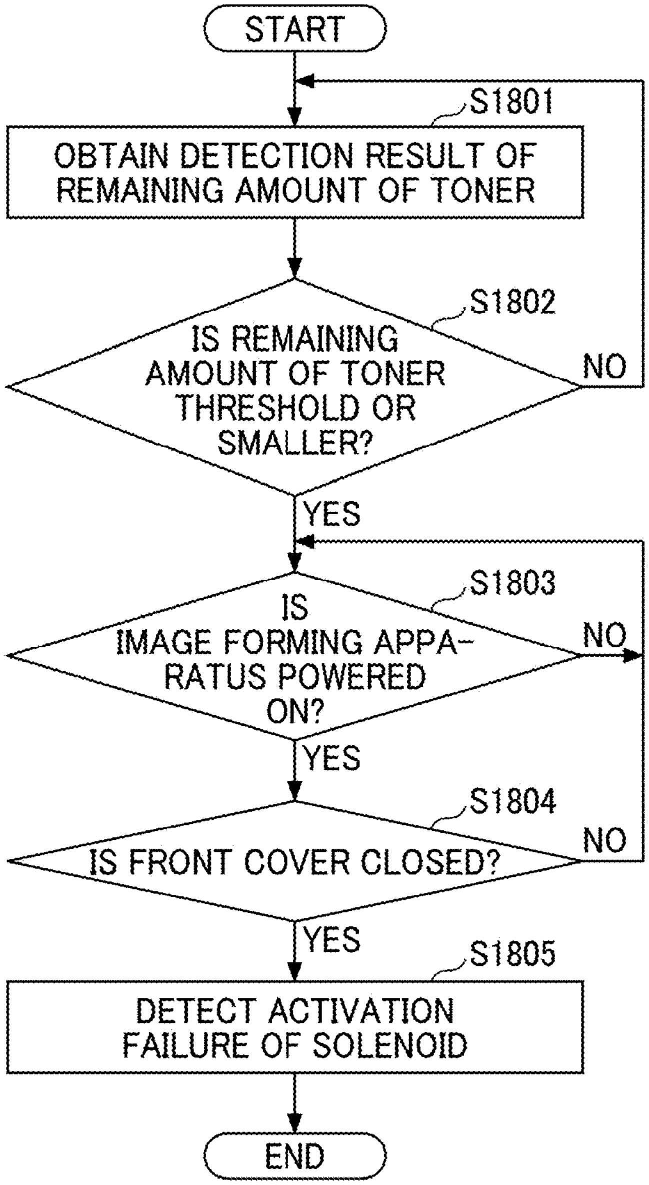
FIG. 8 is a flowchart of first processes for detecting a failure that the solenoid is not turned on, that is, an unlocking failure, that are performed by the image forming apparatus according to the first embodiment of the present disclosure depicted in FIG. 6.

FIG. 8 is a flowchart of first processes for detecting the activation failure of the solenoid 154 (e.g., the unlocking failure), that are performed by the image forming apparatus 100 according to the embodiment.

Referring to FIG. 8, a description is provided of the first processes for detecting the activation failure of the solenoid 154 with respect to the toner bottle 130a.

The first processes depicted in FIG. 8 are also applied to each of the toner bottles 130b, 130c, and 130d. Hence, a description of the first processes applied to each of the toner bottles 130b, 130c, and 130d is omitted.

In step S1801, the CPU 161 of the controller 156 obtains a detection result of the remaining amount of toner contained in the toner bottle 130a from the remaining amount detection sensor 165a through the I/O control unit 164.

Subsequently, in step S1802, the CPU 161 determines whether or not the remaining amount of toner contained in the toner bottle 130a is the threshold T or smaller. If the CPU 161 determines that the remaining amount of toner contained in the toner bottle 130a is greater than the threshold T (NO in step S1802), after a predetermined time period elapses, the CPU 161 resumes step S1801.

Conversely, if the CPU 161 determines that the remaining amount of toner contained in the toner bottle 130a is the threshold T or smaller (YES in step S1802), the CPU 161 determines whether or not it is a time when the image forming apparatus 100 is powered on in step S1803. If the CPU 161 determines that it is not the time when the image forming apparatus 100 is powered on (NO in step S1803), the CPU 161 resumes step S1803.

Conversely, if the CPU 161 determines that it is the time when the image forming apparatus 100 is powered on (YES in step S1803), the CPU 161 determines whether or not the front cover 102 is closed based on a signal sent from the push sensor 104 in step S1804. If the CPU 161 determines that the front cover 102 is not closed and therefore is open (NO in step S1804), the CPU 161 resumes step S1803.

Conversely, if the CPU 161 determines that the front cover 102 is closed (YES in step S1804), the CPU 161 instructs the driving control unit 155 to detect the activation failure of the solenoid 154 (e.g., the unlocking failure). Thus, the driving control unit 155 detects the activation failure of the solenoid 154 (e.g., the unlocking failure) in step S1805.

In the first processes described above, the driving control unit 155 does not detect the activation failure of the solenoid 154 for the bottle covers 140a, 140b, 140c, and 140d that cover the toner bottles 130a, 130b, 130c, and 130d each of which contains toner in a sufficient remaining amount. Thus, the image forming apparatus 100 reduces power consumption.

According to the embodiment, the first processes for detecting the activation failure of the solenoid 154 (e.g., the unlocking failure) are not limited to the processes depicted in FIG. 8 and may employ other processes.

Figure 9:
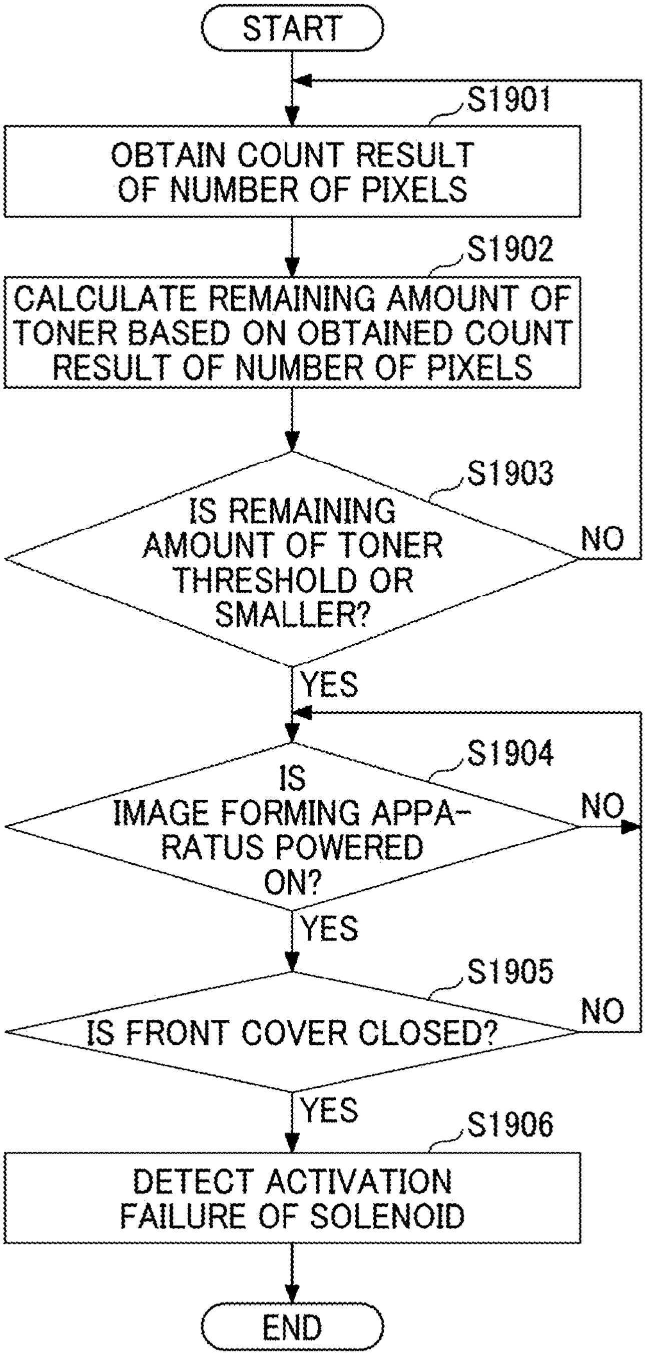
FIG. 9 is a flowchart of second processes for detecting the failure that the solenoid is not turned on, that is, the unlocking failure, that are performed by the image forming apparatus according to the first embodiment of the present disclosure depicted in FIG. 6.

FIG. 9 is a flowchart of second processes for detecting the activation failure of the solenoid 154 (e.g., the unlocking failure), that are performed by the image forming apparatus 100 according to the embodiment.

Referring to FIG. 9, a description is provided of the second processes for detecting the activation failure of the solenoid 154 with respect to the toner bottle 130a.

The second processes depicted in FIG. 9 are also applied to each of the toner bottles 130b, 130c, and 130d. Hence, a description of the second processes applied to each of the toner bottles 130b, 130c, and 130d is omitted.

In step S1901, the CPU 161 of the controller 156 obtains a count result of a number of pixels of an image, that has been output from a pixel counter incorporated in the image forming apparatus 100 through the I/O control unit 164 after the toner bottle 130a was replaced.

In step S1902, the CPU 161 calculates the remaining amount of toner contained in the toner bottle 130a based on the obtained count result of the number of pixels.

Subsequently, in step S1903, the CPU 161 determines whether or not the remaining amount of toner contained in the toner bottle 130a is the threshold T or smaller. If the CPU 161 determines that the remaining amount of toner contained in the toner bottle 130*a* is greater than the threshold T (NO in step S1903), after a predetermined time period elapses, the CPU 161 resumes step S1901.

Conversely, if the CPU 161 determines that the remaining amount of toner contained in the toner bottle 130*a* is the threshold T or smaller (YES in step S1903), the CPU 161 determines whether or not it is the time when the image forming apparatus 100 is powered on in step S1904. If the CPU 161 determines that it is not the time when the image forming apparatus 100 is powered on (NO in step S1904), the CPU 161 resumes step S1904.

Conversely, if the CPU 161 determines that it is the time when the image forming apparatus 100 is powered on (YES in step S1904), the CPU 161 determines whether or not the front cover 102 is closed based on a signal sent from the push sensor 104 in step S1905. If the CPU 161 determines that the front cover 102 is not closed and therefore is open (NO in step S1905), the CPU 161 resumes step S1904.

Conversely, if the CPU 161 determines that the front cover 102 is closed (YES in step S1905), the CPU 161 instructs the driving control unit 155 to detect the activation failure of the solenoid 154 (e.g., the unlocking failure). Thus, the driving control unit 155 detects the activation failure of the solenoid 154 (e.g., the unlocking failure) in step S1906.

In the second processes depicted in FIG. 9, the CPU 161 calculates the remaining amount of toner contained in the toner bottle 130*a* based on the count result of the number of pixels. Hence, even in a case that the image forming apparatus 100 does not incorporate the remaining amount detection sensor 165*a* or the like that detects the remaining amount of toner contained in the toner bottle 130*a* directly, the driving control unit 155 detects the failure according to the remaining amount of toner contained in the toner bottle 130*a*. Accordingly, the image forming apparatus 100 omits the remaining amount detection sensor 165*a* or the like, reducing costs. Additionally, the driving control unit 155 does not detect the activation failure of the solenoid 154 for the bottle covers 140*a*, 140*b*, 140*c*, and 140*d* that cover the toner bottles 130*a*, 130*b*, 130*c*, and 130*d*, respectively, each of which is estimated to contain toner in a sufficient remaining amount. Thus, the image forming apparatus 100 reduces power consumption.

The controller 156 detects the deactivation failure of the solenoid 154 (e.g., the locking failure) without power supply to the solenoid 154. Hence, even if the controller 156 detects the deactivation failure of the solenoid 154 frequently, no problem occurs. Additionally, the controller 156 preferably detects the deactivation failure of the solenoid 154 early.

In a case that the image forming apparatus 100 is powered on, the controller 156 according to the embodiment as one example of a failure detector instructs the driving control unit 155 to detect the deactivation failure of the solenoid 154 (e.g., the locking failure). The driving control unit 155 detects the deactivation failure of the solenoid 154 (e.g., the locking failure), in other words, the failure that the locking device 150 does not retain the locking state.

Figure 10:
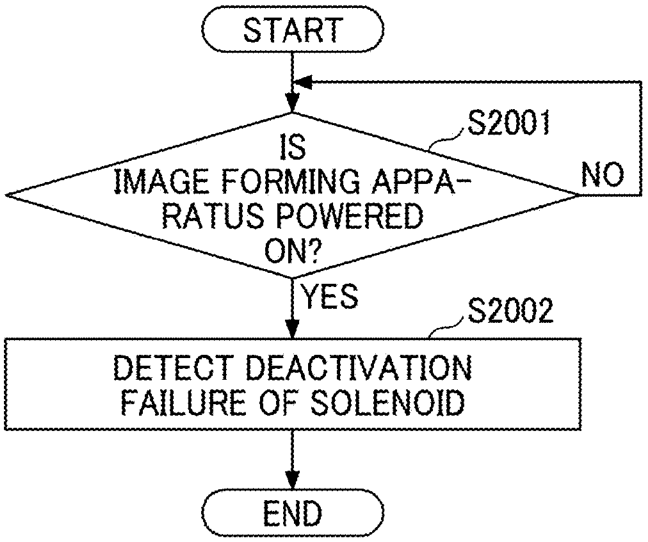
FIG. 10 is a flowchart of first processes for detecting a failure that the solenoid is not turned off, that is, a locking failure, that are performed by the image forming apparatus according to the first embodiment of the present disclosure depicted in FIG. 6.

FIG. 10 is a flowchart of first processes for detecting the deactivation failure of the solenoid 154 (e.g., the locking failure), that are performed by the image forming apparatus 100 according to the embodiment.

Referring to FIG. 10, a description is provided of the first processes for detecting the deactivation failure of the solenoid 154 with respect to the toner bottle 130*a*.

The first processes depicted in FIG. 10 are also applied to each of the toner bottles 130*b*, 130*c*, and 130*d*. Hence, a description of the first processes applied to each of the toner bottles 130*b*, 130*c*, and 130*d* is omitted.

In step S2001, the CPU 161 of the controller 156 determines whether or not it is the time when the image forming apparatus 100 is powered on. If the CPU 161 determines that it is not the time when the image forming apparatus 100 is powered on (NO in step S2001), the CPU 161 resumes step S2001.

Conversely, if the CPU 161 determines that it is the time when the image forming apparatus 100 is powered on (YES in step S2001), the CPU 161 instructs the driving control unit 155 to detect the deactivation failure of the solenoid 154 (e.g., the locking failure). Thus, the driving control unit 155 detects the deactivation failure of the solenoid 154 (e.g., the locking failure) in step S2002.

According to the embodiment, the first processes for detecting the deactivation failure of the solenoid 154 (e.g., the locking failure) are not limited to the processes depicted in FIG. 10 and may employ other processes.

Figure 11:
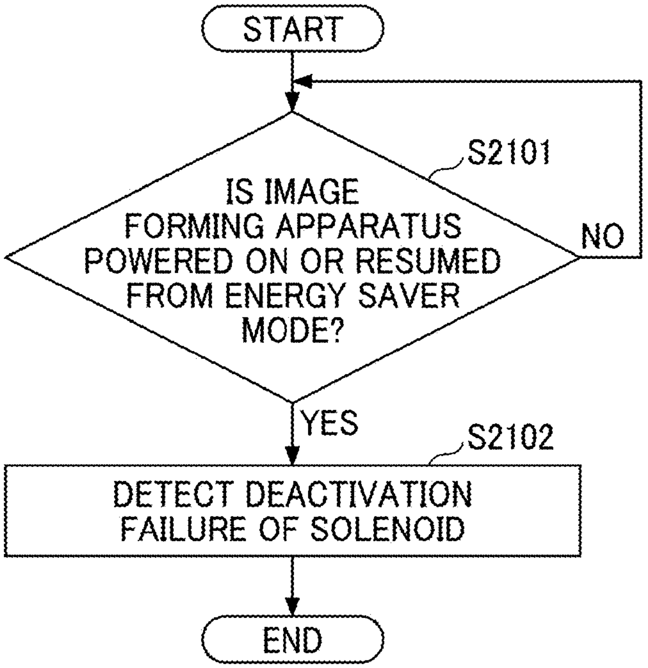
FIG. 11 is a flowchart of second processes for detecting the failure that the solenoid is not turned off, that is, the locking failure, that are performed by the image forming apparatus according to the first embodiment of the present disclosure depicted in FIG. 6.

FIG. 11 is a flowchart of second processes for detecting the deactivation failure of the solenoid 154 (e.g., the locking failure), that are performed by the image forming apparatus 100 according to the embodiment.

Referring to FIG. 11, a description is provided of the second processes for detecting the deactivation failure of the solenoid 154 with respect to the toner bottle 130*a*.

The second processes depicted in FIG. 11 are also applied to each of the toner bottles 130*b*, 130*c*, and 130*d*. Hence, a description of the second processes applied to each of the toner bottles 130*b*, 130*c*, and 130*d* is omitted.

In step S2101, the CPU 161 of the controller 156 determines whether or not it is a time when the image forming apparatus 100 is powered on or a time when the image forming apparatus 100 resumes from an energy saver mode. If the CPU 161 determines that it is neither the time when the image forming apparatus 100 is powered on nor the time when the image forming apparatus 100 resumes from the energy saver mode (NO in step S2101), the CPU 161 resumes step S2101.

Conversely, if the CPU 161 determines that it is the time when the image forming apparatus 100 is powered on or the time when the image forming apparatus 100 resumes from the energy saver mode (YES in step S2101), the CPU 161 instructs the driving control unit 155 to detect the deactivation failure of the solenoid 154 (e.g., the locking failure). Thus, the driving control unit 155 detects the deactivation failure of the solenoid 154 (e.g., the locking failure) in step S2102.

In the second processes depicted in FIG. 11, compared to the first processes depicted in FIG. 10, the driving control unit 155 detects the deactivation failure of the solenoid 154 (e.g., the locking failure) even when the image forming apparatus 100 resumes from the energy saver mode. Hence, the image forming apparatus 100 detects the deactivation failure of the solenoid 154 early.

According to the embodiments described above, the controller 156 detects the failure when the image forming apparatus 100 is powered on, for example. However, the embodiments described above do not limit the time when the controller 156 detects the failure. Alternatively, the controller 156 may detect the failure at other times.

A description is provided of a configuration of an image forming apparatus 100A according to a second embodiment of the present disclosure.

According to the embodiments described above, the service engineer checks the detection result of the failure through the exterior device 170. However, the embodiments of the present disclosure are not limited to a method in which the service engineer visits a site where the image forming apparatus 100 is located and checks the detection result of the failure like the control methods according to the embodiments described above.

Figure 12:
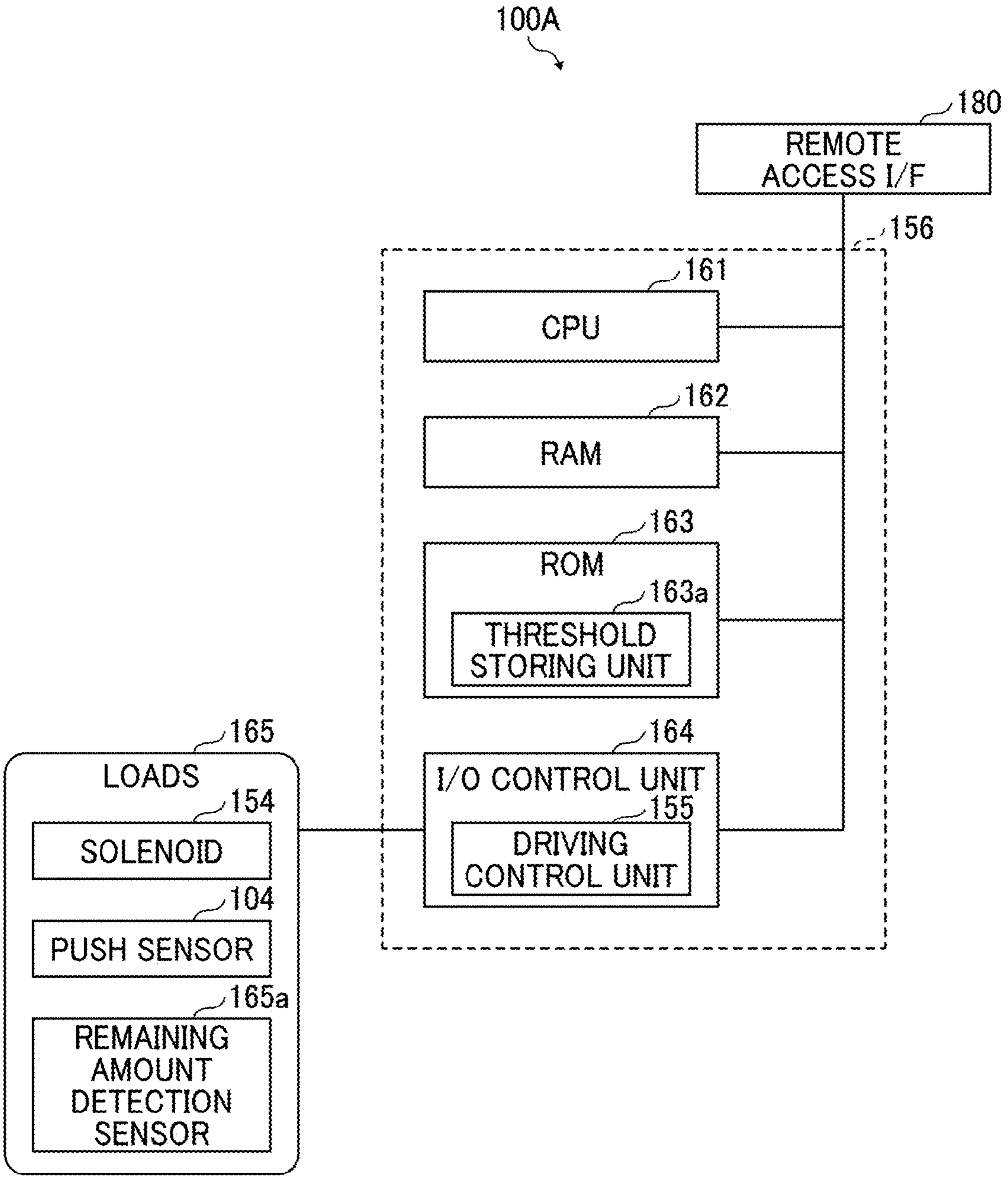
FIG. 12 is a block diagram of an image forming apparatus according to a second embodiment of the present disclosure, illustrating a configuration of a controller incorporated therein.

FIG. 12 is a block diagram of the image forming apparatus 100A according to the second embodiment, illustrating a configuration of the controller 156 incorporated therein. The controller 156 depicted in FIG. 12 is connected to a remote access interface (I/F) 180. The controller 156 communicates with a maintenance center of the image forming apparatus 100A through the remote access I/F 180. The image forming apparatus 100A includes the components other than the remote access I/F 180, that are equivalent to the components of the image forming apparatus 100 described above with reference to FIG. 6. Hence, a description of the components other than the remote access I/F 180 is omitted.

According to the second embodiment, the CPU 161 controls transmission and reception of control commands to and from the maintenance center as one example of a remote center through the remote access I/F 180. The CPU 161 controls an entirety of the image forming apparatus 100A according to a control command received from the maintenance center.

The CPU 161 sends a usage of the image forming apparatus 100A to the maintenance center through the remote access I/F 180. Hence, the maintenance center recognizes a decreased amount of toner contained in each of the toner bottles 130*a*, 130*b*, 130*c*, and 130*d*, for example.

The CPU 161 receives a control command to change the threshold T from the maintenance center through the remote access I/F 180. The CPU 161 changes the threshold T based on the received control command. Hence, according to the second embodiment, the maintenance center changes the threshold T according to the decreased amount of toner contained in each of the toner bottles 130*a*, 130*b*, 130*c*, and 130*d*. That is, the maintenance center changes the threshold T without dispatching the service engineer to the site where the image forming apparatus 100A is located.

Additionally, the CPU 161 sends the detection result of the failure to the maintenance center through the remote access I/F 180. Accordingly, the maintenance center recognizes the failure of the image forming apparatus 100A.

The above describes the embodiments in which each of the toner bottles 130*a*, 130*b*, 130*c*, and 130*d* serves as the replacement. However, the replacement is not limited to each of the toner bottles 130*a*, 130*b*, 130*c*, and 130*d* as long as the replacement is a part that is installed in an image forming apparatus (e.g., the image forming apparatuses 100 and 100A) such that the part is replaced. For example, the replacement may be other consumable container that contains a consumable (e.g., a lubricant and a developer) consumed during image formation. The replacement may be a container such as a waste toner container that contains a waste generated during image formation. The replacement may be a replacement unit such as a photoconductor, a developing unit, and a fixing unit.

The image forming apparatus (e.g., the image forming apparatuses 100 and 100A) according to the embodiments has the construction described above. Accordingly, when the remaining amount of toner contained in the toner bottle 130*a*, 130*b*, 130*c*, or 130*d* decreases, the controller 156 detects the failure to determine whether or not the locking device 150 switches to the unlocking state in which the locking device 150 unlocks the bottle cover 140*a*, 140*b*, 140*c*, or 140*d*. Consequently, the image forming apparatus decreases a downtime. Further, the image forming apparatus reduces power consumption.

A description is provided of a construction of a comparative image forming apparatus.

The comparative image forming apparatus includes a toner bottle cover that covers an opening through which a toner bottle is removably inserted into an interior of the comparative image forming apparatus. In order to prevent a user from removing the toner bottle erroneously, the comparative image forming apparatus further includes a toner bottle cover solenoid, as one example of a locking mechanism that locks the toner bottle cover.

With the comparative image forming apparatus incorporating the locking mechanism that locks the toner bottle cover, in a case that the locking mechanism suffers from a failure, the user may not open the toner bottle cover. When the locking mechanism does not unlock the toner bottle cover for replacement of the toner bottle, the user recognizes the failure of the locking mechanism initially.

Accordingly, when the user replaces the toner bottle with a new one, the faulty locking mechanism may prohibit the user from replacing the toner bottle until a service engineer finishes repairing the locking mechanism. Hence, the comparative image forming apparatus may suffer from an extended downtime.

In order to address the circumstances of the comparative image forming apparatus described above, as illustrated in FIGS. 2, 3, 5A, 5B, 6, and 12, an image forming apparatus (e.g., the image forming apparatuses 100 and 100A) includes a replacement (e.g., the toner bottles 130*a*, 130*b*, 130*c*, and 130*d*), a storage (e.g., the toner bottle storage compartment 103), an open-close member (e.g., the bottle covers 140*a*, 140*b*, 140*c*, and 140*d*), a locking device (e.g., the locking device 150), a cover (e.g., the front cover 102), a cover detector (e.g., the push sensor 104), and a failure detector (e.g., the controller 156).

The replacement contains toner with which an image is formed. The storage stores the replacement. The storage has an opening (e.g., the opening 131) through which the replacement is inserted into and removed from the storage. The open-close member opens and closes the opening. The locking device locks the open-close member in a state in which the open-close member closes the opening. The cover opens and closes. In a state in which the cover closes, the cover covers the open-close member and prohibits the open-close member from opening. The cover detector detects whether or not the cover closes. In a case that the cover detector detects that the cover closes and that the failure detector determines that an amount of the toner contained in the replacement is not greater than a predetermined threshold (e.g., the threshold T), the failure detector detects an unlocking failure of the locking device to determine whether or not the locking device switches to an unlocking state in which the locking device unlocks the open-close member.

According to the embodiments of the present disclosure, the failure detector detects the failure of the locking device at a proper time, decreasing a downtime of the image forming apparatus.

The above describes the embodiments of the present disclosure. However, the technology of the present disclosure is not limited to the embodiments described above and is modified and replaced variously within the scope of the present disclosure.

According to the embodiments described above, the image forming apparatus 100 is a multifunction peripheral (MFP). Alternatively, the image forming apparatus 100 may be a copier, a printer, a facsimile machine, an inkjet recording apparatus, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:

a replacement configured to contain a consumable;

a storage configured to store the replacement, the storage having an opening through which the replacement is inserted into and removed from the storage;

an open-close member configured to open and close the opening;

a locking device configured to lock the open-close member in a state in which the open-close member closes the opening;

a cover configured to open and close, the cover configured to close to cover the open-close member and prohibit the open-close member from opening;

a cover detector configured to detect whether or not the cover closes; and a failure detector configured to detect an unlocking failure of the locking device by determining whether or not the locking device switches to an unlocking state in which the locking device unlocks the open-close member, in response to the cover detector detecting that the cover closes and the failure detector determining that an amount of the consumable contained in the replacement is not greater than a predetermined threshold.

2. The image forming apparatus according to claim 1, wherein, in a case in which the image forming apparatus is powered on, the failure detector detects a locking failure of the locking device by determining whether or not the locking device retains a locking state in which the locking device locks the open-close member.

3. The image forming apparatus according to claim 1, wherein, in a case in which the image forming apparatus resumes from an energy saver mode, the failure detector detects a locking failure of the locking device by determining whether or not the locking device retains a locking state in which the locking device locks the open-close member.

4. The image forming apparatus according to claim 1, further comprising an exterior device configured to receive a command, wherein the failure detector changes the predetermined threshold according to the command received from the exterior device.

5. The image forming apparatus according to claim 1, further comprising a remote access interface configured to receive a command, wherein the failure detector changes the predetermined threshold according to the command received from the remote access interface.

6. The image forming apparatus according to claim 1, wherein the locking device includes a solenoid configured to move to switch between a locking state in which the locking device locks the open-close member and the unlocking state in which the locking device unlocks the open-close member.

7. The image forming apparatus according to claim 6, wherein the failure detector supplies power to the solenoid and detects the unlocking failure of the locking device by determining whether or not the locking device switches to the unlocking state in which the locking device unlocks the open-close member.

8. The image forming apparatus according to claim 6, wherein the locking device further includes:

a hook mounted on the open-close member;

a latch configured to engage the hook to lock the open-close member; and a link engaging the latch, the link moved by the solenoid.

9. The image forming apparatus according to claim 1, wherein the consumable includes toner with which an image is formed.

10. The image forming apparatus according to claim 9, wherein the replacement includes a toner bottle containing the toner.

11. The image forming apparatus according to claim 10, wherein the open-close member includes a bottle cover configured to cover the toner bottle stored in the storage.

12. The image forming apparatus according to claim 1, wherein the cover detector includes a push sensor.

13. The image forming apparatus according to claim 1, wherein the failure detector includes a controller.

14. An image forming method comprising:

obtaining a detection result of a remaining amount of a consumable contained in a replacement in an image forming apparatus;

determining that the remaining amount of the consumable is not greater than a predetermined threshold;

determining that the image forming apparatus is powered on;

determining that a cover is closed; and detecting an unlocking failure of a locking device in the image forming apparatus by determining whether or not the locking device switches to an unlocking state in which the locking device unlocks an open-close member configured to open and close an opening of a storage storing the replacement, in response to detecting that the cover is closed and determining that an amount of the consumable contained in the replacement is not greater than the predetermined threshold.

15. An image forming method comprising:

calculating a remaining amount of a consumable contained in a replacement in an image forming apparatus;

determining that the remaining amount of the consumable contained in the replacement is not greater than a predetermined threshold;

determining that the image forming apparatus is powered on; and in a case in which the image forming apparatus is powered on, detecting a locking failure of a locking device in the image forming apparatus by determining whether or not the locking device retains a locking state in which the locking device locks an open-close member configured to open and close an opening of a storage storing the replacement.

* * * * *